Patented Aug. 11, 1953

2,648,638

UNITED STATES PATENT OFFICE 2,648,638

METHOD FOR PREPARING A TELLURIUM OXIDE-CONTAINING CATALYST

Frederick P. Richter, Woodbury, N. J., assignor to Socony-Vacuum Oil Company, Incorporated, a corporation of New York No Drawing. Application January 19, 1950,
Serial No. 139,529

4 Claims. (Cl. 252—439)

The present invention relates to the oxidation of organic compounds and more particularly to the catalytic conversion of methyl and methylene groups to carbonyl groups by gas containing free oxygen in the presence of finely divided catalyst comprising predominantly at least one oxide of tellurium. It is to be understood that the phrase "gas containing free oxygen" includes elemental oxygen, pure diatomic oxygen, diatomic oxygen diluted with an inert gas such as nitrogen, helium, carbon dioxide and triatomic oxygen or ozone and air.

As pointed out by C. H. Fisher and Abner Eisner in a paper entitled "Tellurium Compounds as Friedel-Crafts Catalysts," J. Org. Chem. 6,169 (1941), the dioxides of tellurium and selenium might be expected to play similar roles because of the positions occupied by tellurium and selenium in the periodic table and because both oxides are reduced by hydrazine, hydroxylamine and certain organic substances such as glucose and phenylhydrazine. However, these investigators report that whereas selenium dioxide reacted readily with p-chloroacetophenone in boiling alcohol, or at 100° C. without a solvent, no reaction occurred between the same ketone and tellurium dioxide in boiling alcohol, or without solvent at 100° C. Furthermore, these authors report that while dianthrone apparently is formed by the oxidation of anthrone with selenium dioxide, the reaction of anthrone with tellurium dioxide in boiling alcohol for 10 hours and without solvent at 200° C. for 0.5 hour does not produce the same product. When a mixture of hydroquinone, tellurium dioxide and water was distilled by these authors, there was no reaction; when selenium dioxide was substituted for the tellurium compound, quinone passed over in about 30 per cent yield. When hydroquinone was heated with tellurium dioxide without a solvent at 190° C., it was oxidized readily, but quinone was not isolated on steam distillation.

Although diphenylmethane was oxidized in excellent yield by selenium dioxide at 200–210° C. this hydrocarbon was scarcely attacked by tellurium dioxide when refluxed (260° C.) for one hour. Anthracene also was virtually unaffected by refluxing with tellurium dioxide whereas a good yield of anthraquinone is obtained with selenium dioxide at 165–170° C.

It is to be noted that the foregoing reactions were carried out in the liquid phase employing stoichiometric rather than catalytic amounts of the dioxide. On the other hand selenium does not lend itself readily to cyclic operations whereas tellurium does. For example, selenium is not oxidized by gaseous oxygen in the absence of a catalyst such as oxides of nitrogen at an appreciable rate at temperatures below about 450° C. whereas tellurium in a finely divided state is readily oxidized by oxygen and at temperatures as low as room temperature. Selenium dioxide is produced in the laboratory by adding commercial selenium powder in small amounts to an excess of concentrated nitric acid. Upon removing excess nitric acid and dehydration of the residue, selenium dioxide is obtained. A product of high purity also can be obtained by direct oxidation of selenium with air or oxygen, using traces of nitrogen oxides as catalysts to promote the reaction. However, in a cyclic operation using stoichiometric amounts of selenium dioxide as an oxidizing agent the selenium precipitated by the reduction of the selenium dioxide by the organic compound can be filtered off the reaction mixture, washed with an indifferent solvent, converted to crystalline selenium, ground to a fine powder, washed again to remove organic impurities and then converted to the dioxide for reuse. On the other hand, tellurium can be used in non-stoichiometric catalytic amounts for the oxidation of organic compounds with gas containing free oxygen and the catalyst regenerated in situ. Thus, for example, propylene mixed with air was passed over a tellurium catalyst and the production of acrolein in yields of over five mole per cent per pass achieved. On the other hand, when a selenium catalyst was substituted for the tellurium catalysts, but conditions other than reaction temperature maintained the same, only a trace of acrolein was obtained and the selenium catalyst became inactivated at a much more rapid rate. It will be appreciated that a reaction temperature such as employed with tellurium could not be used with selenium because the selenium was rapidly volatilized at temperatures of 250–400° C. Furthermore, it is to be noted that when selenium was used as a catalyst copious amounts of hydrogen selenide were produced. On the other hand, it is known that tellurium does not form hydrogen telluride under the conditions of this reaction. Several other differences between selenium and tellurium may be recognized at this point. (For example, metallic selenium has quite a tendency to form organo-selenium compounds when contacted with hydrocarbons at elevated temperatures whereas metallic tellurium is relatively unreactive in this respect.)

Selenium dioxide is extremely soluble in water, alcohols and a variety of oxygen-containing solvents; in contrast, tellurium dioxide is almost quantitatively insoluble in the same solvents.

Thus, while those skilled in the art, using the periodic table as a basis, would suggest that tellurium and selenium would react in a similar manner, the foregoing discussion establishes that there is considerable difference between the reactions of selenium and tellurium. In spite of indications to the contrary, it has now been found that tellurium can be used as an oxidation catalyst in vapor phase reactions in the presence of gas containing free oxygen.

In general, the present method involves contacting the vapors of an organic substance having hydrogen atoms activated by the proximity of a double bond; i. e., alpha to an unsaturated carbon atom, or a hydroxyl group with a gas containing free oxygen in the presence of finely divided catalyst comprising predominantly at least one oxide of tellurium to obtain a compound containing a carbonyl group.

Broadly illustrative of the classes of compounds which may be oxidized in this manner and the products obtained are the following equations:

(1)
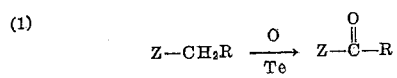

where Z is a monovalent radical having at least one center of unsaturation such as C=O; a group capable of oxidation to a carbonyl group for example a hydroxyl group; C≡C; C=C; or the double bond of an aryl group directly adjacent to the methyl or methylene group and R is hydrogen or alkyl or cycloalkyl or aryl or alicyclic or heterocyclic; when R is other than hydrogen it can be substituted by any substituent which will survive under the reaction conditions, for example, a phenyl group, a halogen, a nitro group and the like.

(1)

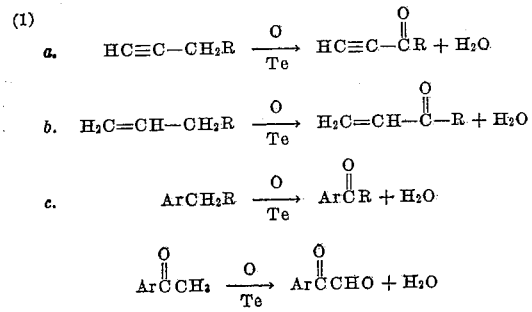

where Ar is an aryl radical substituted or unsubstituted.

(2)

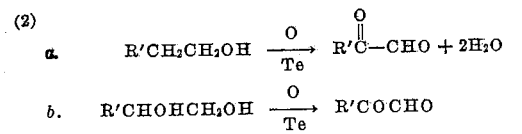

where R' is hydrogen, alkyl, cycloalkyl, aryl, heterocyclic and where other than hydrogen may be substituted by any substituent which will survive under the reaction conditions, for example, a phenyl group, a halogen, a nitro group and the like.

It will be recognized that in the foregoing Z=HC≡C—; H₂C=CH—; Ar—; ArC=O—; R'CH₂—; R'CHOH—; and R'OH—.

(3) Compounds containing a center of unsaturation directly adjacent a methyl or methylene group such as the double bond of an aryl group as an integral part of an alicyclic ring system:

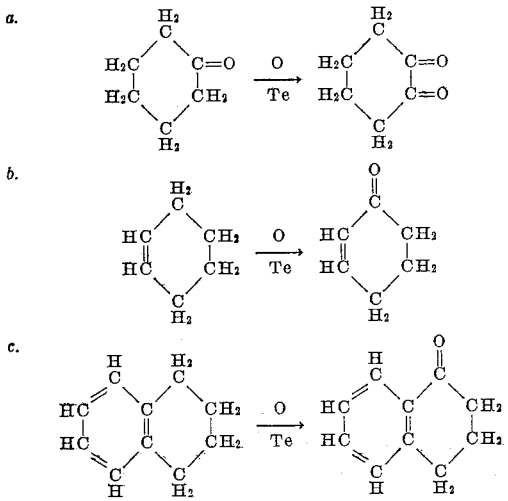

It is to be noted that

has been used in the foregoing equations to indicate a reaction taking place in the presence of a gas containing free oxygen as defined hereinbefore and a finely divided catalyst comprising predominantly at least one oxide of tellurium.

Tellurium both of the "C. P." and "Technical" grades has been used in preparation of the catalyst for the oxidation of organic substances of the class described hereinbefore. The "C. P." grade tellurium had the following analysis:

Tellurium content_____ 99% to 99.8%
Selenium content_____ None
Other impurities such as_____ Slight traces lead, copper bismuth.

The "Technical" grade tellurium was reported to have a tellurium content of about 95%.

The manner in which the finely divided catalyst comprising at least one oxide of tellurium is used apparently is unimportant. For example, it can be used as a finely divided, unsupported catalyst, as a finely divided catalyst on an inert support or an "active" support, or as "massive" tellurium which has been activated. It is to be noted that an "active" support is one which in the absence of catalyst comprising predominantly at least one oxide of tellurium but in the presence of a gas containing free oxygen accelerates the oxidation of organic substances of the class described hereinbefore usually to produce oxidation products other than those of the carbonyl type illustrated hereinbefore. An organic carbonyl group is a group which exists in that state of oxidation which is intermediate between a primary or secondary alcohol and a carboxylic acid. An inert support is one which in the absence of catalyst comprising predominantly at least one oxide of tellurium but in the presence of a gas containing free oxygen does not accelerate to any appreciable extent the oxidation of organic substances of the class described hereinbefore to produce oxidation products.

A catalyst giving satisfactory conversion of organic substances of the class defined hereinbefore was prepared as follows:

Twenty parts by weight of tellurium dioxide were dissolved in about 200 parts by weight of aqueous hydrochloric acid (about 28 per cent HCl) and the mixture heated to effect solution. The solution was then concentrated to about one-third the original volume and poured over 310 parts by weight of inert alumina of 8–14 mesh size. The alumina was inert "fused" alumina previously treated with hot aqueous nitric acid and washed with distilled water. The mixture of alumina particles and the solution of tellurium dioxide in hydrochloric acid was agitated to ensure a homogeneous coating on the alumina particles. The yellow, wet mass of coated alumina particles was then treated with sulfur dioxide gas. Thereupon, the particles rapidly turned black indicative of the deposition of finely divided tellurium. The black particles were then treated in a furnace at temperatures of about 150° C. to about 350° C. with nitrogen gas to remove water, hydrogen chloride and any oxides of sulfur which might be present. The catalyst, finely divided tellurium on an inert support, was then ready for use as a catalyst in the oxidation of organic substances of the class defined hereinbefore to organic substances containing at least one additional carbonyl group.

The catalyst, prepared as described hereinbefore, was used in the oxidation of propylene to acrolein.

Example I

A gaseous mixture of propylene and air in the proportion of one volume of propylene to 9 volumes of air was passed at essentially atmospheric pressure through 2 volumes of catalyst at the rate of 10 volumes of the gaseous mixture per minute or a space velocity of 5. The temperature of the reaction zone was maintained at about 600° to about 650° F.

The effluent gases were passed through water maintained at about 0° to about 10° C. to absorb the product and thus separate it from the unreacted propylene. (Other methods of separating the acrolein from the unreacted propylene can be used; for example, fractional condensation.) The presence of acrolein in the water was established by conversion of the acrolein to its dinitrophenylhydrazone by treatment with an alcoholic solution of 2,4-dinitrophenylhydrazine in the manner well known to those skilled in the art.

Propylene has been oxidized to acrolein with over 5 mole per cent conversion per pass employing a propylene to air mixture of 1 volume to 7 volumes, a space velocity of 4 and a temperature of about 570° to about 775° F.

Example II

A mixture of refinery gases, a propylene-propane fraction, having the following composition:

| | Mole per cent |
|---|---|
| Propylene | 52.0 |
| Propane | 45.6 |
| Ethylene | 1.0 |
| Ethane | 1.0 |
| Butenes | 0.2 |
| n-Butane | 0.1 |
| Iso-pentane | 0.1 | was passed over a catalyst comprising predominantly at least one oxide of tellurium on a silica gel support. The propylene-propane fraction of refinery gases was mixed with air in the proportion of one volume of refinery gases to three volumes of air and the mixture passed over the aforesaid silica gel supported catalyst at a space velocity of 8 at atmospheric pressure. The reaction chamber was held at a temperature of about 752° F.

The product was absorbed in water at a temperature below 10° C. Analysis of the aqueous solution indicated that about 12.6 per cent of the propylene charged was converted to acrolein. In other words, the conversion was about 12.6 per cent per pass. The effluent gases after removal of the acrolein can be recycled.

Example III

Methacrolein was obtained by oxidizing isobutylene with air in the presence of finely divided catalyst comprising predominantly at least one oxide of tellurium in the manner described hereinafter.

A mixture of isobutylene and air in the ratio of one volume of isobutylene to nine volumes of air was passed at atmospheric pressure over a "tellurium" catalyst at a temperature of about 655° F. The "tellurium" catalyst comprised at least one oxide of tellurium supported by fused alumina. The products of the reaction were separated from the unreacted isobutylene and the principal product of conversion shown to be methacrolein by treatment with 2,4-dinitrophenylhydrazine to form the 2,4-dinitrophenylhydrazone of methacrolein having a melting point of 205°–206° C. (uncorr.).

Analysis of the aqueous solution of the products of conversion established that about 6.9 per cent of the isobutylene was converted to methacrolein; i. e., about 7 per cent conversion per pass. The effluent gases, after removal of the conversion products, can be recycled.

Example IV

Toluene was converted to benzaldehyde in the following manner. A mixture of toluene and air in the ratio of about one volume of toluene vapor to about six volumes of air was passed at atmospheric pressure over a "tellurium" catalyst held at a temperature of about 750° to 760° F. The effluent gases were cooled and the product and unreacted toluene condensed. The unreacted toluene was separated from the products of conversion by fractional distillation. The residue was treated with 2,4-dinitrophenylhydrazine in the usual manner and the 2,4-dinitrophenylhydrazone of benzaldehyde obtained. The dinitrophenylhydrazone of benzaldehyde melted at 240°–241° C. (corr.).

The catalyst is finely divided and comprises predominantly at least one oxide of tellurium and can be supported or unsupported. The catalyst can be obtained by mechanical subdivision of the metal, by reduction of the dioxide, by hydrolysis of an orthotellurate ester or by any other suitable means known to the art.

While the catalyst can be finely divided metallic tellurium, or activated massive tellurium or a tellurium oxide at the outset of the reaction, there is evidence to indicate that the actual catalyst is a labile system of metallic tellurium and at least one oxide of tellurium. Thus, for example, a suitable material is finely divided metallic tellurium obtained by mechanical subdivision of the metal. Another suitable form of the catalyst is metallic tellurium obtained by reduction of the dioxide, by hydrolysis of an orthotellurate ester and other suitable means known to the art. However, the finely divided metallic tellurium is preferably activated by alternate oxidation and reduction with a final oxidation or activation by treatment with a mixture of hydrocarbon and gas containing free oxygen. A simple but satisfactory application of this latter method is passage of the organic material having a methyl or methylene group directly adjacent to a center of unsaturation admixed with a gas containing free oxygen through finely divided metallic tellurium. After an induction period the catalytic reaction is initiated. Thus, while the catalyst initially is predominantly in the form of the metal, it is manifest that the catalytic material comprises predominantly, i. e. at least 50 per cent, of an oxide of tellurium.

The supports can be of the inert type or the "active" type. Inert supports are those such as "fused" alumina which per se do not accelerate oxidation reactions. "Active" supports are those which, like silica gel, per se accelerate the oxidation of olefins to CO, $CO_2$ and $H_2O$. It will be understood that when a "tellurium" catalyst supported on an "active" support is used, there is a tendency for a greater proportion of the reactant or reactants to be converted to the products of ultimate oxidation. Other materials which may be used for supporting the finely divided tellurium are carbon, porous porcelain and the like.

Another form of catalyst which has been found to catalyze the reaction described hereinbefore is modified "massive" tellurium. "Massive" tellurium has been used to designate the tellurium metal sticks industrially available. While tellurium in this form is not an effective catalyst, the "massive" tellurium becomes an effective catalyst upon surface treatment to provide a relatively large surface area as compared with the volume. Such treatment merely involves alternate oxidation and reduction of the surface of the metal with; e. g., oxygen and hydrogen respectively.

In a manner similar to that described hereinbefore many compounds conforming to the general formulae, (1) Z—$CH_2R$ and (2) $RCHOHCH_2OH$; i. e., compounds having at least one methyl or methylene group directly adjacent to a center of unsaturation or directly adjacent to a hydroxyl group can be oxidized to the corresponding compounds in which the methyl or methylene group is present as aldehydic or ketonic group by gas containing free oxygen in the presence of finely divided catalyst comprising predominantly at least one oxide of tellurium.

Reaction temperatures between the normal boiling point and the temperature of decomposition of the organic substance to be oxidized can be used. For many reactions temperatures of about 200° to about 550° C. have been found useful but optimum temperatures will be dependent upon the individual conditions encountered. Thus, for example, the preferred temperature for the conversion of propylene to acrolein is about 350° to about 425° C. while the preferred temperature for the conversion of isobutylene to methacrolein is about 340° to about 350° C. Similarly, the preferred temperature range for the conversion of toluene to benzaldehyde is about 395° to about 405° C.

While the conversions described hereinbefore were all carried out at atmospheric pressure, any reasonable pressure including sub-atmospheric pressures can be used.

The organic substance to oxidizing gas ratio can be varied over a wide range although it is preferred to use ratios of about 1:1 to about 1:9.

Broadly defined, the substances which can be oxidized with air or other gas containing free oxygen in the presence of nonstoichiometric quantities of finely divided catalyst comprising predominantly at least one oxide of tellurium, are those having hydrogen atoms attached to a carbon atom alpha to an unsaturated carbon atom such as in olefins of three or more carbon atoms; isolated diolefins; i. e., diolefins in which there is at least one methylene or substituted methylene group between the olefinic carbons; acetylenic hydrocarbons having at least three carbon atoms; conjugated diolefins of more than four carbon atoms; cycloolefins, for example, cyclopentadiene; aromatic hydrocarbons, such as xylene, methyl naphthalenes, methyl anthracenes and the like or alpha to a hydroxyl group, such as ethanol, propanol, pentanol, isopentanol, octanol, octadecanol, octadecenol, ethandiol, propandiol, butylene glycol, pentylene glycol, octandiol and in general hydrocarbons, substituted hydrocarbons and primary and secondary alcohols of up to 22 carbon atoms. For example, paraffin wax (18–24 carbon atoms) can be halogenated, dehydrohalogenated to the olefinic form and then oxidized.

Thus, for example, substituted butadiene derivatives conforming to the general formula,

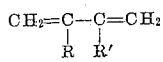

wherein R and R' are alkyl or aryl groups substituted or unsubstituted can be oxidized in the manner described hereinbefore and converted to the corresponding carbonyl compounds.

Thus, for example, 1,3-butadiene, 1,3-pentadiene (alpha - methylbutadiene) 1,4-pentadiene, 2-methyl-1,3-butadiene (isoprene), 1,5-hexadiene (diallyl), 2-methyl-1,4-pentadiene (isodiallyl), 2,3-dimethyl - 1,3 - butadiene (diisopropenyl), 3-methyl-1,3-hexadiene 3-methyl-2,4-hexadiene, 2,7-heptadiene, 4-methyl-1,6-heptadiene, 2,5-dimethyl-2,4-hexadiene, 3-methyl-1,5-octadiene, 1,4-nonadiene, 3,7-decadiene can be oxidized with air in the presence of finely divided catalyst comprising predominantly at least one oxide of tellurium at temperatures of about 350° to about 550° C. or generally at temperatures at which the diolefin is gaseous but below the cracking temperature of the diolefin to the corresponding carbonyl compounds.

Illustrative of another group of hydrocarbons which can be oxidized to the corresponding carbonyl compounds in gaseous phase with pure or diluted gaseous oxygen in the presence of the "tellurium" catalyst at temperatures at which the hydrocarbon is gaseous but below the cracking temperature of the hydrocarbon are the following members of the acetylene series: 2-butyne, 2-pentyne, 2-hexyne, 3-hexyne, 4-methyl-2-pentyne, 3-heptyne, 5-methyl-2-hexyne, 4,4-dimethyl - 2 - pentyne, 5-methyl-5-ethyl-3-heptyne, 2-undecyne, 6-dodecyne, 2-hexadecyne, 9-octadecyne.

Illustrative of the aromatic hydrocarbons which can be oxidized to the corresponding carbonyl compounds by air in the presence of the "tellurium" catalyst at temperatures between the normal boiling point of the hydrocarbon and the cracking temperature thereof are trimethylbenzene, o-ethyltoluene (1-methyl-2-ethylbenzene) 1-methyl-2-propyl-benzene, 1,3-dimethyl-4-ethylbenzene, tetramethylbenzene, 1-methyl-4-isobutylbenzene, 1,2 - dimethyl-4-propylbenzene, 1,2,4 - trimethyl - 5 - ethylbenzene, 1 - methyl-3-amylbenzene, 1,3 - dimethyl-4,6-diethylbenzene, 1-methyl - 2 - propyl-4-isopropylbenzene, 1,3,5-trimethyl - 2,4 - diethylbenzene, alpha and beta styrene, 1-phenyl-1,3-butadiene, 1-methyl-4-propenylbenzene, 1-phenyl-2-pentene, dimethyl naphthalene, dimethylanthracene, dimethylphenanthrene and the like.

Illustrative of the cyclo-olefins which can be oxidized to the corresponding carbonyl compounds by air in the presence of the "tellurium" catalyst at temperatures between the boiling point and the cracking temperature of the cyclo-olefin are 1-methyl-1-cyclobutene, 1-methyl-1-cyclopentene, 1-2-dimethyl-1-cyclopentene, 1-methyl-2-ethyl-1-cyclopentene, 1-methyl-2-propyl-1-cyclopentene, 1,2-dimethyl-1-cyclohexene, and 1-ethyl-3-methyl-1-cyclohexene.

Illustrative of the organic compounds, having a methyl or methylene group activated by the presence of a hydroxyl group, which can be oxidized to the corresponding carbonyl compounds by gaseous oxygen (pure or diluted), ozone and air in the presence of the "tellurium" catalyst at temperatures between the boiling point of the compound and the temperature at which said compound cracks or decomposes are the following: glycol, propandiol-1,2; propandiol-1,3; 1,2-dihydroxybutane, 1,4-dihydroxybutane, 2,3-dihydroxyhexane and the like. Monohydroxy compounds such as the aliphatic alcohols, ethanol, butanol, propanol, hexanol, octanol and the like can also be oxidized to the corresponding carbonyl compounds by gaseous oxygen in the presence of the "tellurium" catalyst at temperatures between the boiling point of the alcohol and the temperature at which the alcohol decomposes.

The "tellurium" catalyst prepared as described hereinbefore is ready for use in the method of producing carbonyl compounds described herein without activation. However, when tellurium dioxide (TeO$_2$) on an inert support is to be used as a catalyst for the production of carbonyl compounds, it has been found desirable to activate the material by a series of alternate reductions with hydrogen and oxidations with an oxidizing gas such as air or oxygen the final step of the series being a treatment with an oxidizing gas. A catalyst activated in this manner was used in the conversion, at 400° C., of propylene to acrolein using a molar air to propylene ratio of 2:3 and a contact time of 17 seconds. A 4.5 per cent conversion of propylene to acrolein with a 1.2 per cent conversion to carbon dioxide was achieved.

A catalyst activated in the same manner was employed in the conversion, at 393° C. of propylene to acrolein using a molar air to propylene ratio of 3:0 and a contact time of 25 seconds. A 7.6 per cent conversion of propylene to acrolein with a 2.2 per cent conversion to carbon dioxide was obtained.

It is to be noted that lesser contact times and higher air to propylene ratios both result in considerably lower conversions per pass.

While alternate reduction and oxidation of the tellurium catalyst has been found to provide a satisfactory catalyst, activation of a relatively inert catalyst by contact with a mixture of the compound to be oxidized and oxygen at the temperature at which the oxidation of said compound is to be carried out has given the best results to date.

A characteristic of the catalyst disclosed hereinbefore is its capacity to promote the oxidation of methyl or methylene groups directly adjacent to a center of unsaturation in an organic compound such as, for example, the unsaturation found in aromatic compounds, olefins or carbonyl groups. A further distinguishing feature is the fact that although the catalyst catalyzes the oxidation of such methyl and methylene groups to carbonyl groups, $=C=O$ or

it does not catalyze the oxidation of carbonyl groups to higher states of oxidation. Thus, it is specific for the following transformations:

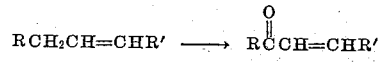

Compounds intermediate between the above reactants and the products in oxidation state such as, for example, benzyl alcohol, allyl alcohol and the like also can be oxidized using the technique disclosed hereinbefore. Ethylene can be oxidized to glyoxal and anthracene to anthraquinone as can organic substances which form in situ reactants such as those the oxidation of which has been discussed herein or their intermediate oxidation products through dehydrogenation, dehydration, rearrangement, dehalogenation, dehydrohalogenation and similar reactions, for instance, methyl cyclohexadiene, tertiary butanol, beta-pinene, 2,3-diiodopropane and alpha-bromodiethylketone.

I claim:

1. The method for preparing a tellurium oxide-containing catalyst, which comprises effecting contact at a temperature in the approximate range of 200° C. to 550° C. between metallic tellurium and a mixture of air and an organic compound having at least one radical selected from the group consisting of methyl and methylene radicals, which radical is characterized by being adjacent to a center of unsaturation, the volume ratio of said compound to air being between about 1:1 and about 1:9, said contact being made with an amount of said mixture and for a time sufficient to oxidize at least 50 per cent of said metallic tellurium to an oxide of tellurium.

2. A method for producing a tellurium oxide-containing catalyst, which comprises mechanically subdividing metallic tellurium and contacting said subdivided metallic tellurium at a temperature between about 200° C. and about 550° C. with a gaseous mixture of oxygen and an organic compound having at least one radical selected from the group consisting of methyl and methylene radicals, which radical is characterized by being adjacent to a center of unsaturation, the volume ratio of said compound to oxygen being between about 1:1 and about 1:9 and the amount of said mixture and the time of contact thereof with said subdivided metallic tellurium being sufficient at the aforementioned temperature to convert at least 50 per cent of the subdivided metallic tellurium to an oxide of tellurium.

3. A method for preparing a tellurium oxide-containing catalyst, which comprises coating a carrier with a tellurium compound capable of conversion by reduction to finely divided metallic tellurium, converting said tellurium compound to finely divided metallic tellurium, thereby yielding a carrier impregnated with finely divided metallic tellurium and effecting contact of said impregnated carrier at a temperature between about 200° C. and about 550° C. with a mixture of an oxygen-containing gas and an organic compound having at least one radical selected from the group consisting of methyl and methylene radicals, which radical is characterized by being adjacent to a center of unsaturation, the volume ratio of said compound to oxygen-containing gas being between about 1:1 and about 1:9, said contact being made with an amount of said mixture and for a time sufficient to convert at least 50 per cent of said finely divided metallic tellurium to an oxide of tellurium.

4. A method for preparing a tellurium oxide-containing catalyst, which comprises subjecting metallic tellurium to alternate oxidation and reduction, the time intervals of said oxidation and reduction each being sufficient to provide a resulting product of increased surface area and thereafter subjecting the tellurium so treated to oxidation at a temperature between about 200° C. and about 550° C. with a mixture of air and an organic compound having at least one radical selected from the group consisting of methyl and methylene radicals, which radical is characterized by being adjacent to a center of unsaturation, the volume ratio of said compound to air being between about 1:1 and about 1:9 and the amount of said mixture and the time of contact thereof with said treated tellurium being sufficient to convert at least 50 per cent of said tellurium to an oxide of tellurium.

FREDERICK P. RICHTER.

References Cited in the file of this patent

UNITED STATES PATENTS

| Number | Name | Date |
|---|---|---|
| 1,103,017 | Ellis | July 7, 1914 |
| 2,105,665 | Lazier et al. | Jan. 18, 1938 |
| 2,161,066 | La Lande | June 6, 1939 |
| 2,295,653 | Griffith et al. | Sept. 15, 1942 |
| 2,383,711 | Clark et al. | Aug. 28, 1945 |
| 2,451,485 | Hearne et al. | Oct. 19, 1948 |